(12) United States Patent
Hill et al.

(10) Patent No.: US 7,346,206 B2
(45) Date of Patent: Mar. 18, 2008

(54) OPTICAL OBJECT DETECTOR

(75) Inventors: Edward A Hill, Oceanside, CA (US); Ken Ko, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 10/601,264

(22) Filed: Jun. 20, 2003

(65) Prior Publication Data
US 2004/0256583 A1   Dec. 23, 2004

(51) Int. Cl.
G06K 9/00 (2006.01)

(52) U.S. Cl. .................. 382/141; 382/312; 358/498; 399/205; 355/57; 250/234

(58) Field of Classification Search ........... 382/141, 382/312; 358/471, 474, 494, 488, 509, 482, 358/296, 498; 399/206, 205, 202, 200; 355/57, 355/66, 60, 55, 71, 51, 69; 362/227; 250/234, 250/235, 559.01
See application file for complete search history.

(56) References Cited

U.S. PATENT DOCUMENTS

| | | | |
|---|---|---|---|
| 4,300,169 A * | 11/1981 | Sato ........................ 358/488 |
| 4,314,159 A * | 2/1982 | Davis .................. 250/559.36 |
| 4,966,354 A * | 10/1990 | Grunder ..................... 270/56 |
| 5,078,379 A * | 1/1992 | Leisner .................... 271/3.04 |
| 5,119,213 A | 6/1992 | Graves et al. |
| 5,397,192 A * | 3/1995 | Khormaee ................. 400/708 |
| 5,448,079 A | 9/1995 | Schultz |
| 5,478,998 A * | 12/1995 | Charych et al. ....... 235/462.43 |
| 5,488,458 A * | 1/1996 | Benedict et al. ............ 399/15 |
| 6,107,913 A * | 8/2000 | Gatto et al. ............ 340/323 R |
| 6,172,360 B1 | 1/2001 | Khovaylo et al. |
| 6,219,158 B1 | 4/2001 | Dawe |
| 6,299,329 B1 | 10/2001 | Mui et al. |
| 6,373,995 B1 | 4/2002 | Moore |
| 6,426,498 B1 | 7/2002 | Bohn et al. |
| 6,643,037 B1 * | 11/2003 | Jeran et al. ................ 358/488 |

FOREIGN PATENT DOCUMENTS

| | | |
|---|---|---|
| JP | 62-296662 | 12/1987 |
| JP | 09-037029 | 2/1997 |
| JP | 11-266343 | 9/1999 |
| JP | 2001-790 | 1/2001 |

* cited by examiner

Primary Examiner—Sheela Chawan

(57) ABSTRACT

An optical object detector including a feed path, a reference pattern facing the feed path, and an optical sensor configured to view the reference pattern through the feed path, absence of the reference pattern from the view of the optical sensor indicating presence of an object in the feed path.

19 Claims, 2 Drawing Sheets

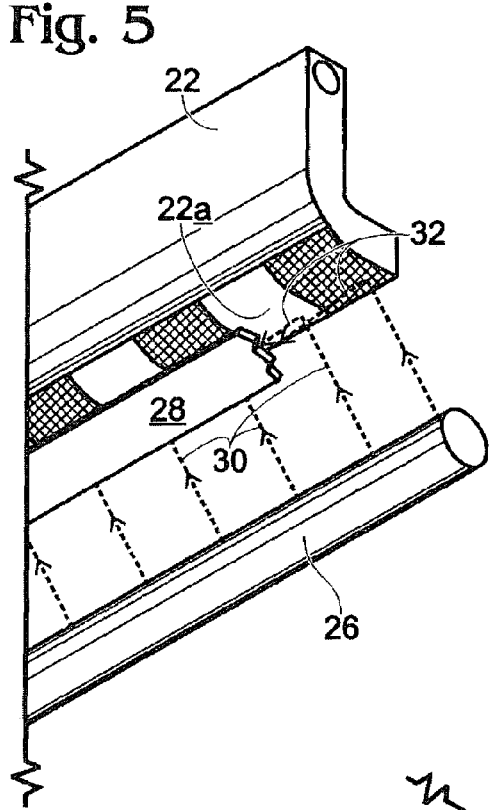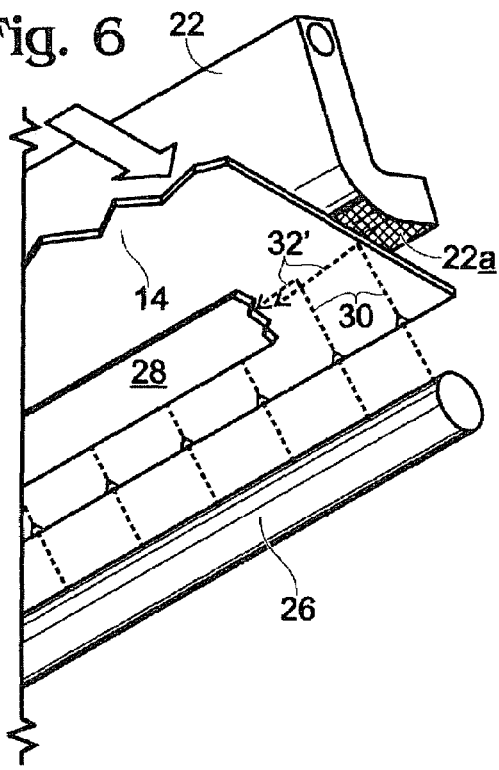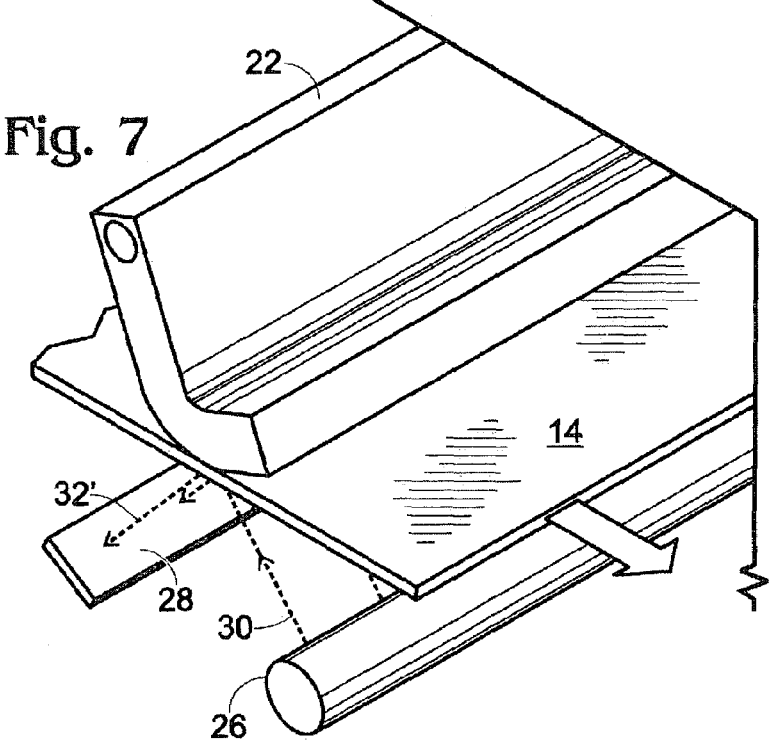

OPTICAL OBJECT DETECTOR

BACKGROUND

Imaging devices such as document scanners typically form images by collecting light reflected from an object, such as a document page being scanned, with numerous light-sensitive elements in a scan module. Each light-sensitive element is typically capable of producing an electronic output signal such as a voltage, which is indicative of the intensity of light reflected from a specific area or pixel of an image on the page. The scan module may be a stationary module for scanning a moving object, or it may be moveably mounted to scan a stationary object.

A backing member may be used to hold an object to be scanned against a transparent object support such as a glass platen. The backing member typically has a reflective white surface, although backing members of other colors may be used for the purpose of eliminating color "bleed through" when scanning certain documents, such as relatively transparent, dark, and/or double-sided documents. In cases where a document is fed into a device for scanning, it is desirable to sense presence of the document in a document load area. A document load sensor may be used for this purpose. The document load sensor may be mechanical or, more typically, optomechanical in nature. Upon sensing presence of a document, the document load sensor may trigger a feed mechanism to advance the document into the device for scanning.

In cases where the scan module is stationary, it may be further desirable to trigger a scanning procedure when the document reaches a scan region aligned with the scan module. This scanning procedure may be triggered by another sensor, which may be mechanical or optomechanical, and which may be similar in nature to the document load sensor. Use of two separate mechanical or optomechanical sensors, one to sense presence of a document in a document load area and another to sense presence of a document in a scan region, may add to the expense and complexity of manufacturing a scanning device.

BRIEF DESCRIPTION OF THE DRAWINGS

FIG. 5 is an isometric view taken from below the scan region as shown in FIG. 2, the view illustrating light emitted by a light source, reflected from the backing, and received at the photosensor.

FIG. 6 is an isometric view similar to that of FIG. 5, but showing an object obstructing the path between the light source and the backing.

FIG. 7 is an isometric view taken from above the scan region and backing as depicted in FIG. 6.

DETAILED DESCRIPTION

Figure 1:
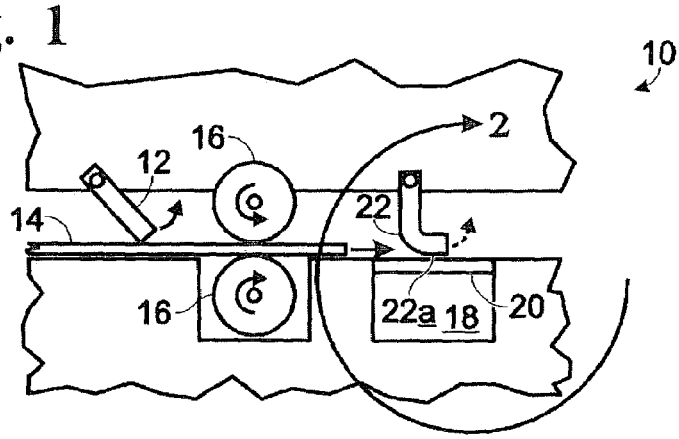
FIG. 1 is a schematic side sectional view of an imaging device which employs a backing to a scan region in accordance with an embodiment of the invention.

FIG. 1 depicts an imaging device in the form of a scanning apparatus 10 for use in scanning objects, such as documents, photos, and/or other items. It will be appreciated that such a scanning apparatus is suitable for use in a scanner, copier, facsimile device or other document processing device.

As indicated, scanning apparatus 10 may include a load sensor 12 for sensing presence of an object, such as a sheet 14, and a feed mechanism 16 for advancing the object along a feed path. In FIG. 1, load sensor 12 takes the form of a mechanical sensor, but other types of sensors, including optical sensors, may be used. Feed mechanism 16 is depicted as a pair of rollers, but other advance and delivery devices, such as opposed belts or the like, may be used instead of, or in addition to, the depicted rollers.

Also shown in FIG. 1 is a stationary scan module 18. Scan module 18 is covered by a transparent support 20, which may be constructed of plate glass or any other substantially transparent material suited to support sheet 14 as it passes by scan module 18. A backing 22 may be positioned opposite scan module 18, such that sheet 14 will pass between backing 22 and scan module 18.

Backing 22 typically extends in a direction transverse to the feed path of sheet 14, with a transverse width that may depend on the range of objects the scanning apparatus is to handle. The placement of scan module 18 and backing 22 generally defines a scan region 24, in which an object may be scanned as described below.

Backing member 22 may be pivotally or otherwise attached to suitable support structure in scanning apparatus 10. In the present illustration, backing 22 is movable, providing for disposition of the backing upon introduction of an object into scan region 24. Backing 22 may include laminated layers of rubber and plastic, defining a patterned surface 22a that nominally faces transparent support 20, and thus, faces scan module 18. Backing 22 may be biased toward its referenced nominal orientation, and may be chosen to have a surface coefficient of friction designed for slidably biasing sheet 14 (or another object) against transparent support 20, as it moves across scan region 24.

Figure 3:
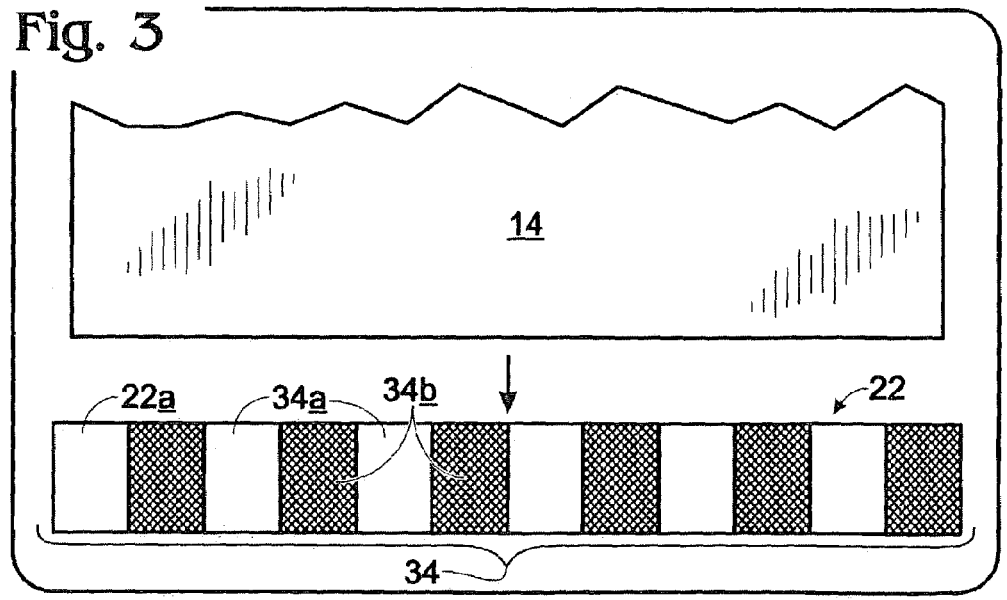
FIG. 3 is a bottom view showing a scan region of the imaging device of FIG. 2 as the object approaches the scan region.

The patterned surface of backing 22 may include a reference pattern 34 (shown in FIG. 3) that is reliably distinguishable from viewable patterns likely to be present on an object to be scanned. For example, reference pattern 34 may include an alternating arrangement of gray and white regions, as depicted in FIG. 3. In general, reference pattern 34 may be defined by any observable arrangement of dots, dashes, lines, colors, and/or detectable codes that may be used to reliably distinguish the patterned surface from surfaces that might be found on objects to be scanned.

As indicated, reference pattern 34 may span the entire length and/or width of backing 22. Alternatively, reference pattern 34 may span only a portion of backing 22, or may be applied to other structure which is viewable through the scan region.

Figure 2:
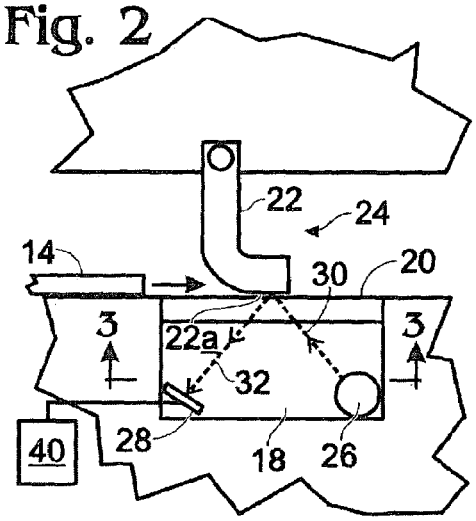
FIG. 2 is an expanded side sectional view of the imaging device of FIG. 1, showing an object during approach to the scan region.

FIG. 2 is an expanded side sectional view of a portion of scanning apparatus 10, including scan module 18, and showing sheet 14 as it approaches backing 22. As indicated, scan module 18 includes a light source 26 which emits light 30 for use in scanning/reading an object within scan region 24. The emitted light nominally passes through transparent support 20, and at least partially reflects from the patterned surface of backing 22. Reflected light 32, which may have an intensity and/or color characteristic different than the intensity and/or color characteristic of emitted light 30, may be focused by imaging optics (not shown) before being received at an optical sensor such as photosensor 28. The photosensor thus may produce a corresponding image signal, and pass such image signal on to a processor (or comparator) 40 for interpretation.

Light source 26 may include one light, or it may include an array of lights configured to produce a light array. In one embodiment, light source 26 employs an array of light-emitting diodes (LEDs) which extend transversely relative to the referenced feed path to generate a light array for reflection from a similarly configured transverse reference pattern.

Photosensor 28 typically includes one or more light-sensitive elements, such as are found in charge coupled devices (CCDs) or CMOS sensors. These light-sensitive elements also may be arranged linearly in a direction transverse to the feed path of sheet 14, and may be configured to receive reflected light 32 from backing 22 and/or sheet 14.

Scan module 18 also may include various optical elements, such as mirrors and imaging lenses, which may be used to direct and focus light. In the interest of clarity, such optical elements are omitted from the drawings.

As set forth above, reflected light 32 may be interpreted by a processor 40 to determine the presence/absence of an object which is to be scanned based on the determined presence/absence of pattern 34 in the reflected light. For example, processor 40 may compare a viewable pattern to the reference pattern, a predetermined difference between such patterns being indicative of presence of an object in the feed path. Absence of the reference pattern from the view of the optical sensor may itself indicate presence of an object in the feed path.

FIG. 3 depicts the scan region of the scanning apparatus of FIG. 2 from below. Sheet 14 is shown approaching backing 22. As stated above, backing 22 includes a pattern not generally found in objects to be scanned. FIG. 3 illustrates an exemplary reference pattern 34. In the depicted illustration, reference pattern 34 defines a plurality of alternating light segments 34a and dark segments 34b. It will be appreciated, however, that various other patterns may be employed, including patterns which cover only a portion of backing 22. Before document 14 arrives in scan region 24, and obscures backing 22, emitted light 30 reflects to varying degrees from backing 22, according to the known reflectivity across reference pattern 34.

Photosensor 28 may be configured to produce an image signal, such as a electrical image signal, in response to receiving reflected light 32. For example, where the photosensor includes a plurality of light-sensitive elements, sequential review of such light-sensitive elements may produce an electrical image signal with a voltage which varies according to a square wave. The voltage thus will be seen to vary corresponding to the varying intensity of light reflected from different parts of backing 22 and received by different light-sensitive elements of photosensor 28. This square-wave signal, which corresponds to reference pattern 34 on backing 22, may serve as a consistently recognizable indication of whether or not reference pattern 34 (and thus backing 22) is within the scan module's field of view. Variation from the expected image signal suggests obstruction of the backing, and thus, presence of an object (e.g., sheet 14) in scan region 24.

Figure 4:
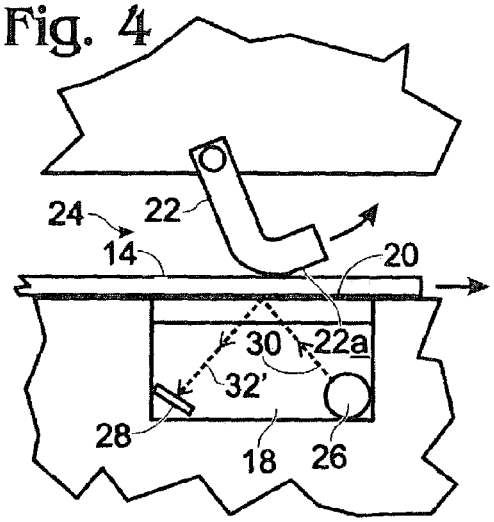
FIG. 4 is an expanded side sectional view similar to FIG. 2, but showing the backing obscured to a photosensor by the object.

FIG. 4 is a view similar to that of FIG. 2, but showing sheet 14 positioned so that the sheet at least partially obscures backing 22. For this reason, it will be appreciated that the present embodiment may work best in connection with non-transparent or opaque media. In this configuration, emitted light 30 reflects substantially from sheet 14, rather than from backing 22. This altered reflected light is indicated generally at 32' to designate a variation from reflected light 32 of FIG. 2. As a result of this variation in reflected light, reference pattern 34 is no longer identified in the image signal produced by photosensor 28. Reflected light 32' thus indicates presence of an object in the scan region, such as sheet 14. In particular, the pattern designed by the image signal derived from reflected light 32' (based on light reflected from an object other than backing 22) reliably differs from the pattern designated by the image signal derived from reflected light 32 (based on light reflected from backing 22). As a result of this difference between the patterns, a predetermined difference in the image signal produced by photosensor 28 from the expected reference image signal indicates presence of an object between the scan module and the backing.

Upon determining presence of an object in scan region 24, processor 40 may begin processing and/or recording successive viewable corresponding to the image signals photosensor 28 generates when it receives reflected light 32'. Processor 40 may compress this data into an electronic image format such as into a JPEG, TIF, GIF, or similar file. Similarly, processor 40 may determine absence of an object in scan region 24 (e.g., by again noting the expected pattern 34), and may trigger an end to the processing and/or recording of successive viewable patterns.

Scan module 18 may be operational upon user direction, or may be active whenever the feed mechanism is active, or upon an indication from a load sensor that an object has entered the feed path. As described above, recording of data may be started and/or stopped as a result of recognizing absence or presence of optically distinguishable reference pattern 34, or based on a comparison between a viewable pattern and reference pattern 34. Absence of reference pattern 34 is a reliable indication that backing 22 is obscured by an object to be scanned. Presence of pattern 34 is a reliable indication that no such object is present. Thus, there is provided an efficient optical determination of presence or absence of an object in scan region 24 using mechanism already in place to scan objects in the feed path. By using the existing scan module for this purpose, the need for a separate mechanical or optomechanical sensor is eliminated.

FIG. 5 is an isometric view showing portions of scan module 18 including light source 26, emitted light 30 directed toward backing 22, and reflected light 32 directed toward photosensor 28. FIG. 6 is an isometric view similar to FIG. 5, showing obscuring of backing 22 by an object such as sheet 14. FIG. 7 is another isometric view, showing top portions of document 14 obscuring backing 22 from light source 26 and photosensor 28.

To start a scanning procedure, an object such as a sheet, a document, or other object may be placed in an input portion of a scanning apparatus, such as scanning apparatus 10. A document load sensor may, if present, automatically detect presence of the object in the input portion of the apparatus, triggering an advance mechanism, such as a set of rollers, to advance the object toward a scan region of the scanning apparatus. The load sensor may also trigger a light source to begin emitting light toward the scan region. Alternatively, an object may be placed into the scan region manually, and the light source may be activated manually.

An optically distinguishable reference pattern may be provided in the scan region, for example, on a backing or other suitable surface. Light arriving in the scan region from the light source may, in the absence of an object to be scanned, be at least partially reflected from the pattern. In the presence of an object to be scanned, light arriving at the scan region may be at least partially reflected from the object itself, which may obscure at least a portion of the reference pattern.

Light reflected from the scan region may arrive or be directed toward a photosensor, which may detect the light and generate an image signal corresponding to the viewable pattern. The generated image signal may be transmitted to a processor for interpretation. Where no object is present in the scan region, the image signal will correspond to the reference pattern of the backing. Where an object is present in the scan region, the image signal will correspond, at least in part, to the viewable pattern of the object which obscures at least a portion of the reference pattern. Upon receiving an image signal, the processor may compare such image signal to a reference image signal corresponding to the reference pattern. Alternatively, the processor may be configured to compare viewable pattern (corresponding to the received image signal) with the known reference pattern.

Discrepancy between the viewable pattern and the reference pattern suggests presence of an object in the scan region, obscuring the backing. Nevertheless, a determination of the presence of an object in the scan region may be reserved unless a predetermined threshold difference is identified, whether based on specified points on the line, repeated detected differences, or otherwise.

The processor may be configured to operate in either an active state, where it continuously records and/or processes received signals, or in a null state, where it does not continuously record received signals. Upon performing a comparison as described above, the processor may be configured to perform various functions depending on its current state, and on the results of the comparison.

For example, if the pattern is found to be different from the reference pattern (indicating presence of an object obscuring the pattern in the scan region) then, the processor may determine whether its status is null or active. If the status is determined to be null, then the processor may be configured to switch to an active state. In other words, the processor may be configured to begin recording and/or processing received signals corresponding to an image of an obscuring object, upon first detecting the object in the scan region. If the viewed pattern is found to be substantially different from the reference pattern and the processor status is determined to be active, then the status may remain active and another determination of the viewed pattern may be made.

If the viewable pattern is found to be substantially identical to the reference pattern (indicating absence of an object obscuring the reference pattern in the scan region), then the processor may also determine whether its status is null or active. If the status is determined to be null, then the status may remain null and another determination of the viewed pattern may be made. If, however, the status is determined to be active, the processor may be configured to switch to a null state, since an object is no longer obscuring the reference pattern in the scan region so that it is no longer desirable to record data. At this point, the scanning process may end.

As described above, image data recording may be controlled by a processor, in conjunction with reflected light received by a photosensor. The processor may also be configured to process recorded data using various algorithms, for example by compressing the data into standard image formats such as JPEG, TIF, GIF, and the like. Upon switching from an active state to a null state, indicating that scanning of an object has been completed, the processor may be further configured to send one or more signals to various components of the scanning apparatus. For example, the processor may be configured to signal a document advance mechanism to rapidly advance the scanned object into an exit region, and/or it may signal an automatic feeder to begin feeding a new document into the apparatus in preparation for another scanning procedure.

While the present description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. An optical object detector comprising:
   a feed path;
   a reference pattern facing the feed path;
   an optical sensor configured to view the reference pattern through the feed path, absence of the reference pattern from the view of the optical sensor indicating presence of an object in the feed path;
   wherein the optical sensor includes a scanner and wherein the reference pattern at least partially defines a backing to a scan region along the feed path such that absence of the reference pattern from view of the scanner indicates presence of a to-be-scanned object in the scan region.

2. The optical object detector of claim 1, wherein the reference pattern extends substantlaily across the backing, transverse to the feed path.

3. The optical object detector of claim 1, wherein the backing is selectively retractable from the scan region.

4. The optical object detector of claim 1, wherein the backing is pivotally retractable upon passage of a to-be-scanned object into the scan region, thereby removing the reference pattern from view of the scanner.

5. A method of detecting an object in a feed path, the method comprising:
   viewing the feed path to identify a viewable pattern, the viewable pattern nominally being a reference pattern disposed opposite a point of view through the feed path, wherein the viewing the feed path includes emitting light toward a scan region of the feed path and detecting light reflected from the scan region, such reflected light defining the viewable pattern;
   comparing the viewable pattern to the reference pattern, a predetermined difference between the viewable pattern and the reference pattern indicating presence of an object in the feed path,
   wherein viewing the feed path and comparing the viewable pattern to the reference pattern are performed iteratively, and wherein initially noting the predetermined difference between the viewable pattern and the reference pattern indicates entry of the object into the scan region.

6. The method of claim 5, which further comprises feeding an object through the scan region to alter view of the reference pattern from the point of view through the scan region.

7. The method of claim 5, which further comprises feeding an object through the scan region to obstruct view of the reference pattern.

8. The method of claim 5, which further comprises feeding an object through the scan region to displace the reference pattern.

9. The method of claim 5, which further comprises iteratively recording viewable patterns to define a scanned image upon noting the predetermined difference between the viewable pattern and the reference pattern.

10. The method of claim 9, which further comprises ceasing recording of viewable patterns upon noting substantial identity between the viewable pattern and the reference pattern.

11. A method of directing scanning in an imaging device, the method comprising:
   iteratively viewing a scan region, from opposite a backing having a reference pattern thereon, to identify a viewable pattern in the scan region; and
   upon noting a change in the viewable pattern from a pattern substantially identical to the reference pattern to a pattern substantially different from the reference pattern, beginning recording of iteratively viewed viewable patterns.

12. The method of claim 11, which further comprises, upon noting a change in the viewable pattern from a pattern substantially different from the reference pattern to a pattern substantially identical to the reference pattern, ceasing recording of iteratively viewed viewable patterns.

13. The method of claim 11, wherein viewing the scan region includes emitting an array of light toward the scan region and detecting a corresponding array of light reflected from the scan region.

14. An imaging device comprising:
   feed mechanism configured to direct an object along a feed path through a scan region of the imaging device;
   a backing to the scan region, the backing defining a reference pattern;
   an optical sensor configured to view the scan region to identify a viewable pattern as viewed by the optical sensor;
   a processor configured to identify presence in the scan region of an object which is to be scanned by the imaging device based on comparison of the viewable pattern with the reference pattern;
   wherein the optical sensor is configured to periodically view the scan region, and wherein the processor is configured to record viewable patterns which are different from the reference pattern.

15. The imaging device of claim 14, wherein the reference pattern is selected to reliably differ from viewable patterns of objects in the feed path.

16. An imaging device comprising:
   feed mechanism configured to direct an object along a feed path through a scan region of the imaging device;
   a backing to the scan region, the backing defining a reference pattern;
   an optical sensor configured to view the scan region to identify a viewable pattern as viewed by the optical sensor;
   a processor configured to identify presence in the scan region of an object which is to be scanned by the imaging device based on comparison of the viewable pattern with the reference pattern;
   wherein the optical sensor is configured to iteratively view the scan region to define successive viewable patterns, and wherein the processor is configured to note a change in viewable pattern from a pattern substantially identical to the reference pattern to a pattern substantially different from the reference pattern, and upon noting such change, to begin recording of successive viewable patterns.

17. The imaging device of claim 16, wherein the processor is further configured to note a change in viewable pattern from a pattern substantially different from the reference pattern to a pattern substantially identical to the reference pattern, and upon noting such change, to cease recording of successive viewable patterns.

18. An imaging device including a scan region with a backing having a reference pattern thereon, the imaging device comprising:
   means for viewing through the scan region to identify successive viewable patterns; and
   means for comparing the successive viewable patterns with the reference pattern, a difference between viewable pattern and reference pattern signifying presence in the scan region of an object which is to be scanned by the imaging device;
   which further comprises means for noting a change in viewable pattern from a pattern substantially identical to the reference pattern to a pattern substantially different from the reference pattern, and upon noting such change, for beginning recording of successive viewable patterns.

19. An imaging device including a scan region with a backing having a reference pattern thereon, the imaging device comprising:
   means for viewing through the scan region to identify successive viewable patterns; and
   means for comparing the successive viewable patterns with the reference pattern, a difference between viewable pattern and reference pattern signifying presence in the scan region of an object which is to be scanned by the imaging device;
   which further comprises means for noting a change in viewable pattern from a pattern substantially different from the reference pattern to a pattern substantially identical to the reference pattern, and upon noting such change, for ceasing recording of successive viewable patterns.

* * * * *

UNITED STATES PATENT AND TRADEMARK OFFICE
CERTIFICATE OF CORRECTION

| | | |
|---|---|---|
| PATENT NO. | : 7,346,206 B2 | Page 1 of 1 |
| APPLICATION NO. | : 10/601264 | |
| DATED | : March 18, 2008 | |
| INVENTOR(S) | : Edward A. Hill et al. | |

It is certified that error appears in the above-identified patent and that said Letters Patent is hereby corrected as shown below:

In column 6, line 40, in Claim 2, delete "substantlaily" and insert -- substantially --, therefor.

Signed and Sealed this

Fifth Day of May, 2009

JOHN DOLL
*Acting Director of the United States Patent and Trademark Office*